UNITED STATES PATENT OFFICE.

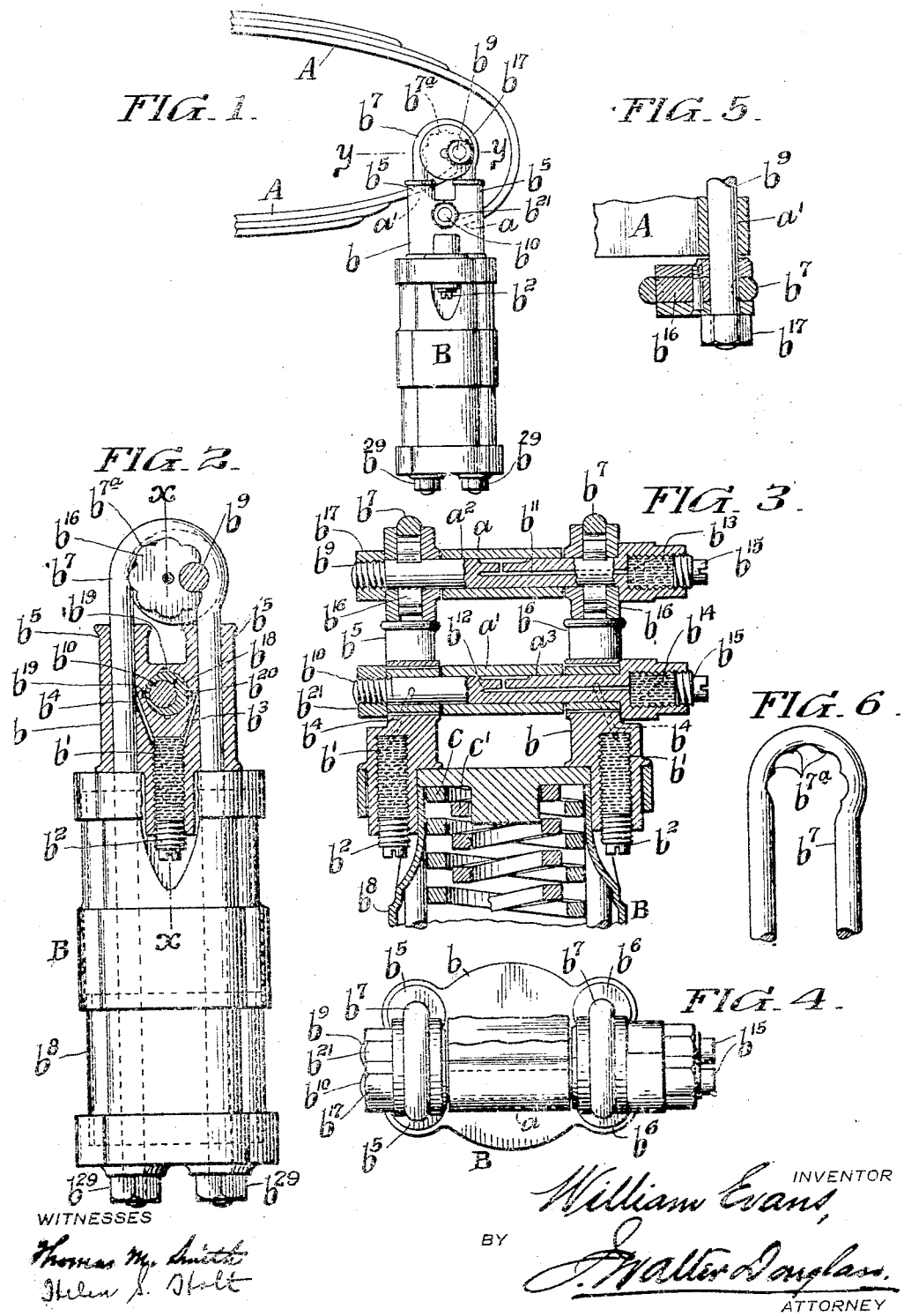

WILLIAM EVANS, OF OAK LANE, PENNSYLVANIA, ASSIGNOR TO WILLIAM EVANS, JOHN H. EVANS, AND ROBERT EVANS, A FIRM OF PHILADELPHIA, PENNSYLVANIA, TRADING AS JOHN EVANS' SONS.

SHOCK-ABSORBER FOR MOTOR-CAR SPRINGS.

1,111,015.      Specification of Letters Patent.      Patented Sept. 22, 1914.

Application filed January 30, 1914.  Serial No. 815,348.

*To all whom it may concern:*

Be it known that I, WILLIAM EVANS, a citizen of the United States, residing at Oak Lane, in the county of Montgomery and State of Pennsylvania, have invented certain new and useful Improvements in Shock-Absorbers for Motor-Car Springs, of which the following is a specification.

My invention has relation to a shock absorber for application to terminal members of motor car springs; and in such connection it relates particularly first, to the constructive arrangement of the absorber; second, to means arranged in the absorber, whereby it may be adjusted and maintained in a vertical position for effective action in its established relation with respective terminal members of the car spring; and third, to the facility with which mechanical means thereof may be manually adjusted to maintain the defined vertical relation of the absorber in connection with the terminal members of the said spring.

The nature, characteristic features and scope of my present invention will be more fully understood from the following description taken in connection with the accompanying drawings forming part hereof, in which—

Figure 1, is a side elevational view of a shock absorber in application to the respective terminal members of leaf motor car springs, showing the vertical position the absorber is caused to assume for operative relation and for maintaining such relation with respect to the terminal members of the said spring, for effective action; the said view embodying the essential main features in conjunction with the constructive arrangement of the absorber of my invention. Fig. 2, is an enlarged detached side view, partly in broken section of the absorber, showing the strap supportingly holding parts together, oil feed and preferred means and manner of manual adjustment in conjunction with the said strap of the absorber to vertical position with respect to terminal members of said spring and for maintaining the same when once adjusted for effective action of the absorber, in use. Fig. 3, is a vertical sectional view on the line $x$, $x$, of Fig. 2, showing also in broken section the two helical springs arranged within each other of the absorber. Fig. 4, is a top plan view of Fig. 1, of the absorber in an operative relation in connection with the car spring. Fig. 5, is a transverse-sectional view on the line $y$, $y$, of Fig. 1; and Fig. 6, is a side elevational view in broken section of the upper part of the strap for lockingly engaging a toothed or ribbed disk and with a bolt in connection with one of the terminals of the motor car spring and for adjusting the absorber therewith.

Referring to the drawings, $a$ and $a^1$, are terminals of a leaf spring A, as shown in Fig. 1, having a shock absorber B, in a vertical established relation with such terminals according to my invention and as hereinafter more fully explained.

The absorber B, consists of a vertical recessed casting $b$, having a grease supply reservoir $b^1$, on both sides in legs of the said casting closed by removable plugs $b^2$, as illustrated in Fig. 3. These reservoirs have obliquely leading therefrom narrow grease ducts or ways $b^3$ and $b^4$, to hollow vertical bearings $b^5$ and $b^6$, for inverted U-shaped straps $b^7$, which extend through a two-part cylindrical housing $b^8$, as shown, sliding one part within the other as clearly shown in Fig. 2, and in which housing are seated helical springs $c$ and $c^1$, preferably arranged one within the other, as clearly shown in broken section in Fig. 3. These straps supportingly maintain the several parts of the absorber in operative relation by means of nuts $b^{20}$, applied to the said strap below the said housing $b^8$, as clearly illustrated in Fig. 2, and which two-part slidable housing rests in normal position on the said nuts in whatever position given on the two terminal portions of the said strap $b^7$.

Bolts $b^9$ and $b^{10}$, are provided in frictional contact with bearings $a^2$ and $a^3$, of the terminal portions $a$ and $a^1$, of the spring A, as clearly shown in Figs. 1 and 3. These bolts are internally bored out to form channels $b^{11}$ and $b^{12}$, leading from grease reservoirs $b^{13}$ and $b^{14}$, in flanged terminals of the bolts $b^9$ and $b^{10}$, as clearly shown in Fig. 3. These reservoirs are closed by removable plugs $b^{15}$, as also clearly illustrated in Fig. 3. The arrangement for the supply of grease as above explained through the bolts to the bearings $a^2$ and $a^3$, of the terminal portions $a$ and $a^1$, of the spring A, insures an easy noiseless frictional movement of the said terminals in their connection with the shock absorber B, as will be clearly understood from Figs. 1 and 3.

The straps $b^7$, at the upper arched portion thereof are grooved and ribbed at $b^{7a}$, to correspond with a complemental disk $b^{16}$, for manually adjusting the said straps in connection with the bolt $b^9$, and its jam nut $b^{17}$, so as to firmly secure the strap $b^7$, in whatever vertical position the absorber is given and which is held in such position by means of the said nut. On the bolt $b^{10}$, at one end portion is mounted an eccentric $b^{18}$, and about the eccentric in the casting $b$, is arranged a series of recesses or pockets $b^{19}$, in which are inserted removable pins $b^{20}$. Upon removal of these pins the eccentric can be shifted to adjust the absorber proper with respect to the terminal bearing $a^3$. When the pins are again inserted the bolt will be held by the said eccentric and locked by the jam nut $b^{21}$, applied to the threaded end of the same to thus establish a firm frictional engagement of the terminal bearing $a^3$, of the spring A, with the said bolt $b^{10}$, and lubricated thereby and correspondingly the terminal bearing $a^2$, of the spring A, will not only be held, but also locked by the toothed locking disk $b^{16}$, with the complemental portion $b^{7a}$, of the strap $b^7$, as illustrated in Figs. 1, 2 and 3.

Effective cushioning action without squeak or noise of the absorber in relation with the spring bearings $a^2$ and $a^3$, can be established, while the absorber is maintained in true vertical alining position by the manner of manual adjustment above explained. Should the absorber be found to be out of such true vertical alining relationship with the terminal members of the spring A, by simply loosening the jam nuts $b^{17}$ and $b^{21}$, respectively, and turning the disk $b^{16}$, or the eccentric $b^{18}$, after first removing the series of pins $b^{20}$, from about the eccentric, can this be manually accomplished. Moreover, the provision in the absorber for thorough lubrication of working parts insures the easy noiseless movement of the same, and hence effective action of the said absorber.

Having thus described the nature and objects of my invention, what I claim as new and desire to secure by Letters Patent is:—

1. A shock absorber provided with a strap having a part to engage a complemental disk and having a bolt arranged to lockingly hold said member together and a bolt carrying an eccentric with locking means in connection therewith, in combination with car spring terminal bearings in connection with said bolts and helical springs supportingly held in operative position by said strap, substantially as and for the purposes described.

2. A shock absorber, comprising a casting in which is journaled an inverted U-shaped grooved and ribbed strap, a complemental disk adapted to be lockingly engaged by said strap and embraced by a cross-belt and a bolt carrying an eccentric having removable means located adjacent thereto for lockingly holding said eccentric in any position given in connection with said bolt, in combination with a spring having terminal bearings engaged by said bolts and helical springs arranged within each other and supportingly held in operative relation within a two part housing slidable one part within the other and supported in position by said strap, substantially as and for the purposes described.

3. The combination with a car spring having terminal bearings, bolts engaging said bearings, an inverted U-shaped locking strap and disk carried on one extremity of one of said bolts and an eccentric carried on the other bolt and locked to position against movement a casting and helical springs held below said casting and supported in operative position by said strap, substantially as and for the purposes described.

4. A car spring the terminal members of which are in frictional contact with cross bolts, a casting and a strap the legs of which are journaled in said casting and carry a two part slidable housing for helical springs supportingly held in operative position by said strap, said cross bolts respectively carrying a ribbed disk to engage and lock with a complemental portion of said strap and an eccentric lockingly held to one of said bolts by a series of insert pins, substantially as and for the purposes described.

In witness whereof, I have hereunto set my signature in the presence of the two subscribing witnesses.

WILLIAM EVANS.

Witnesses:
THOMAS M. SMITH,
HELEN S. HOLT.